(12) United States Patent
Daly

(10) Patent No.: US 6,764,062 B1
(45) Date of Patent: Jul. 20, 2004

(54) PLASTIC THROTTLE BODY

(75) Inventor: Paul D. Daly, Troy, MI (US)

(73) Assignee: Siemens VDO Automotive, Inc., Auburn Hills, MI (US)

(*) Notice: Subject to any disclaimer, the term of this patent is extended or adjusted under 35 U.S.C. 154(b) by 0 days.

(21) Appl. No.: 09/389,266

(22) Filed: Sep. 3, 1999

Related U.S. Application Data

(63) Continuation-in-part of application No. 09/342,590, filed on Jun. 29, 1999.

(51) Int. Cl.[7] .............................. F16K 1/22; F02D 9/08
(52) U.S. Cl. ...................................... 251/305; 123/337
(58) Field of Search ........................... 251/305; 123/337

(56) References Cited

U.S. PATENT DOCUMENTS

| | | | |
|---|---|---|---|
| 3,750,698 A | | 8/1973 | Walchle et al. |
| 4,318,532 A | * | 3/1982 | Winkler ....................... 251/334 |
| 4,786,031 A | * | 11/1988 | Waldrop ...................... 251/305 |
| 5,035,214 A | * | 7/1991 | Daly et al. ................... 251/306 |
| 5,161,673 A | * | 11/1992 | Cairns ......................... 198/781 |
| 5,304,336 A | | 4/1994 | Karlsson et al. |
| 5,934,646 A | * | 8/1999 | Tamura et al. ............... 251/193 |
| 6,189,506 B1 | * | 2/2001 | Vanderveen ................ 123/337 |
| 6,316,935 B1 | * | 11/2001 | Vanzuilen ............... 324/207.21 |
| 2001/0013586 A1 | * | 8/2001 | Torii et al. ................... 251/305 |

FOREIGN PATENT DOCUMENTS

| | | |
|---|---|---|
| EP | 0 433 518 A1 | 6/1991 |
| EP | 0 480 607 A1 | 4/1992 |
| EP | 0 683 340 A1 | 11/1995 |
| EP | 1 065 360 A2 | 1/2001 |
| JP | 11 013496 | 1/1999 |

OTHER PUBLICATIONS

European Search Report dated Jul. 13, 2001.

* cited by examiner

*Primary Examiner*—Henry C. Yuen

(57) ABSTRACT

A throttle valve for throttling the flow of combustion air to an internal combustion engine is disclosed having a throttle body made of a first plastic and defining a throat for passing combustion air and an intersecting passageway to rotatably support a throttle shaft. The throttle shaft is made of a second plastic that is filled with a solid lubricant and extends through the intersecting passageway supported on each end by a boss that is molded concurrently with the throat. The inside surfaces of the bosses support the throttle shaft and are molded in the same molding process that forms the throat. A butterfly is mounted to the shaft for rotation in the conduit to throttle the flow of combustion air. Boss to throat volumetric ratios of 0.5 or less are provided by this construction.

14 Claims, 3 Drawing Sheets

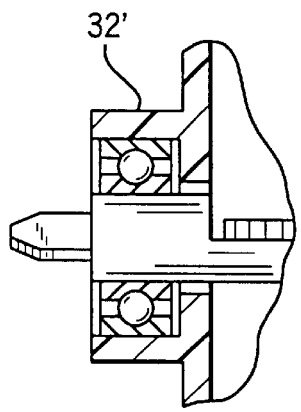
FIG. 4A
PRIOR ART
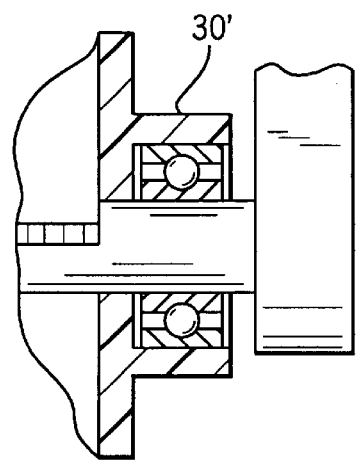
FIG. 4B
PRIOR ART
FIG. 5
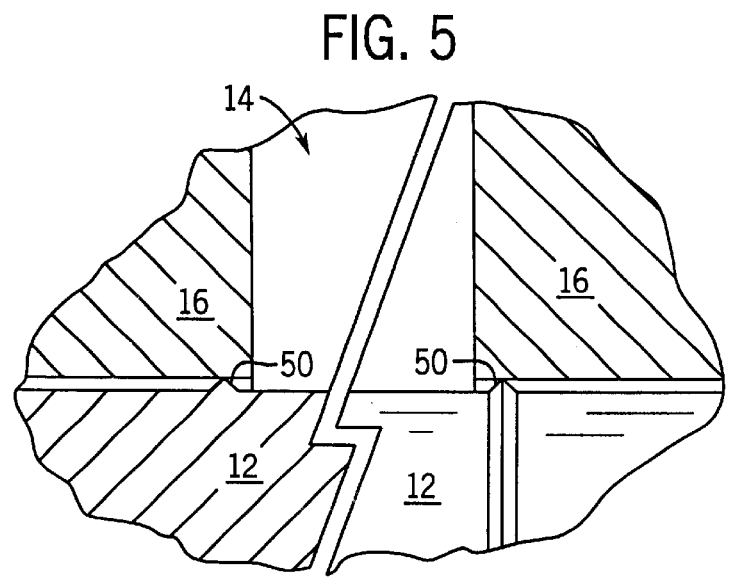

PLASTIC THROTTLE BODY

CROSS-REFERENCE TO RELATED APPLICATION

This application is a continuation-in-part of U.S. patent application Ser. No. 09/342,590, filed Jun. 29, 1999, which is incorporated by reference herein in its entirety.

FIELD OF THE INVENTION

The invention is generally related to valves for throttling the flow of combustion air to an internal combustion engine. More particularly, the invention is related to such valves made from plastic.

BACKGROUND OF THE INVENTION

Throttle valves for large automotive and industrial internal combustion engines have traditionally been made from light metal alloys such as magnesium and aluminum. These materials are resistant to the elevated temperatures in the engine compartments of modern vehicles. They can also be molded to the tight dimensional tolerances required for accurate and repeatable control of air flow over long lifespans of these engines. They also have the strength and stiffness required to support large diameter butterfly valves (typically 50–85 mm) needed for the large volumetric flow rates of such engines.

Automotive throttle valves typically are typically butterfly valves. Butterfly valves have a roughly circular plate called butterfly that is disposed in the circular throat of a throttle body to pass or to block flow, depending upon its rotational position. The butterfly is typically fixed to a throttle shaft that extends across the throat of the throttle body generally perpendicular to the direction if combustion air flow. The throttle shaft extends through at least one the wall of throttle body and is connected to a throttle lever disposed on the outside of the throttle body to rotate the shaft and thereby open and close the throttle valve.

Recently, throttle valves have been proposed and made using a variety of plastic components. For example, the Rover K-3 employs a plastic throttle body with a metal shaft and a plastic bearing insert. U.S. Pat. No. 5,769,045 discloses a plastic throttle body with steel shaft and a metal needle roller bearing insert in the throttle body. U.S. Pat. No. 5,304,336 shows a throttle valve having a plastic throttle body and a simultaneously molded throttle body, shaft, and butterfly. U.S. Pat. No. 5,666,988 discloses a plastic throttle shaft. U.S. Pat. No. 5,098,064 discloses a plastic throttle body with metal bearing inserts for supporting a metal throttle shaft. An example is shown in FIGS. 4A–B. All of these constructions have problems.

There are several problems faced by a manufacturer of throttle valves with plastic components. Among others, throttle body wear is significant. To reduce wear, bearings or bushings are typically into a plastic throttle body to support the throttle valve shaft. High temperatures in engine compartments also pose problems. Creep at elevated temperatures may cause a plastic throttle shaft and butterfly to deform, requiring frequent vehicle tune-ups. If both the throttle body and the throttle shaft are made of plastic, the problems with wear and creep are enhanced since both parts may creep and wear, increasing the probability of misalignment, leakage and failure.

The very manufacture of throttle valves having plastic throttle bodies and plastic shafts is fraught with difficulties. Unless plastic components are carefully designed and made with critical attention paid to wall thicknesses, material selection, cooling rates, and plastic injection pressure to mention but a few factors, they are prone to shrink and deform, which causes misalignment, leakage around the shaft or the butterfly, and even accelerated wear.

The patents cited above suggest several solutions to some of the problems presented by the use of plastics. Unfortunately, the solutions themselves generate their own problems. For example, plastic or metal bearings or bushing may be inserted into bosses extending from the throttle body to support the throttle shaft. This, however, requires large diameter plastic bosses extending from the surface of the throttle body into which the bearing or bushing can be inserted to support the throttle shaft and reduce wear. Unfortunately, these large bosses cause distortion of the throttle body throat, and prevent the throttle valve butterfly from fitting properly into the throat of the throttle body. This distortion is due largely to the increased volumetric ratio of the bosses in relation to the throat itself. The large bosses draw a substantial amount of plastic away from the primary task of filling out the throat of the throttle body. This delays packing out the throat of the throttle body (with pressure) and results in distortion of the throttle body throat, as well as sinks at the bosses themselves. These distortions and sinks prevent a (separately molded) butterfly from properly sealing the throat closed when the butterfly is later inserted into the throat and attached to the throttle shaft. At the very least, these problems require significant throttle body mold alterations and tuning, as well as a precise control of the molding process itself to insure a proper fit between the butterfly and throat.

Another method of avoiding the distortion, sealing and wear problems is to simultaneously mold both the throttle body and the throttle shaft, as shown in U.S. Pat. No. 5,304,336. In this process, the throttle shaft and throttle body are molded in a single manufacturing process, first the throttle body, and then the throttle shaft and integral butterfly. Once the body is molded, the pins that form the interior of the throat and those that form the holes in the bosses that support the throttle shaft are partially withdrawn and molten plastic is injected into the void that is thereby created. In this manner, the just-molded hollow bosses and the interior walls of the throttle body become part of the "mold" and themselves form the throttle shaft and integral butterfly. Distortion and warping are less of a problem in this process, since the throttle shaft and butterfly are formed by the just-molded throttle body itself, rather than being separately molded and later inserted into the throttle body.

While this last process improves sealing by, in effect, custom mating each plastic throttle shaft and butterfly to the plastic throttle body, it requires the use of two quite different thermoplastics: a higher melting point plastic to form the throttle body, and a significantly lower melting point plastic to form the shaft and butterfly. It has also required that manufacturers mold the throttle body using a structural plastic mixed with PTFE (polytetrafluoroethylene). The PTFE acts as a mold release agent and insures that the molded-in-place shaft and butterfly do not stick to the throttle body when it is formed. Unfortunately, it also requires complex molding equipment and precise timing and sequencing of the two-stage injection molding process.

What is needed, therefore is an improved throttle valve construction that may employ a smaller boss to minimize throat distortion, yet does not require complex multistage molding operations, and provides an accurately dimensioned throat that seals satisfactorily to a subsequently inserted and separately molded butterfly.

It is an object of this invention to provide such a throttle valve.

SUMMARY OF THE PRESENT INVENTION

In accordance with the present invention, an improved throttle valve for controlling the flow of combustion air to an internal combustion engine is provided having a throttle body, and a throttle shaft made of a plastic filled with solid lubricant, and a butterfly attached to the throttle shaft.

In accordance with another embodiment of the invention, a throttle valve for throttling the flow of combustion air to an internal combustion engine is provided including, a plastic throttle body that has a throat for passing combustion air and an intersecting passageway that supports the throttle shaft, a plastic throttle shaft filled with a solid lubricant that extends through the intersecting passageway, and a butterfly attached to the shaft for rotation in the throat to throttle the flow of combustion air. The passageway is generally perpendicular to the throat and is defined by two bosses that are molded integral with the throttle body and have an inner molded surface that contacts and supports the throttle shaft. The throttle shaft is integrally molded with a throttle arm that engages a throttle shaft rotating means. The throttle shaft may include at least one boss to which the butterfly is fixed.

Other principal features and advantages of the invention will become apparent to those skilled in the art upon review of the following drawings, the detailed description and the appended claims.

BRIEF DESCRIPTION OF THE DRAWINGS

FIGS. 4A and 4B are partial cross sectional views of a prior art throttle body and throttle shaft showing the use of bearings and large diameter bosses to support a throttle shaft; and FIG. 5 is a fragmentary cross-section of a throttle shaft and supporting bosses showing circumferential sealing ridges disposed about and extending from the shaft where it passes into the throat of the throttle valve.

Figure 1:
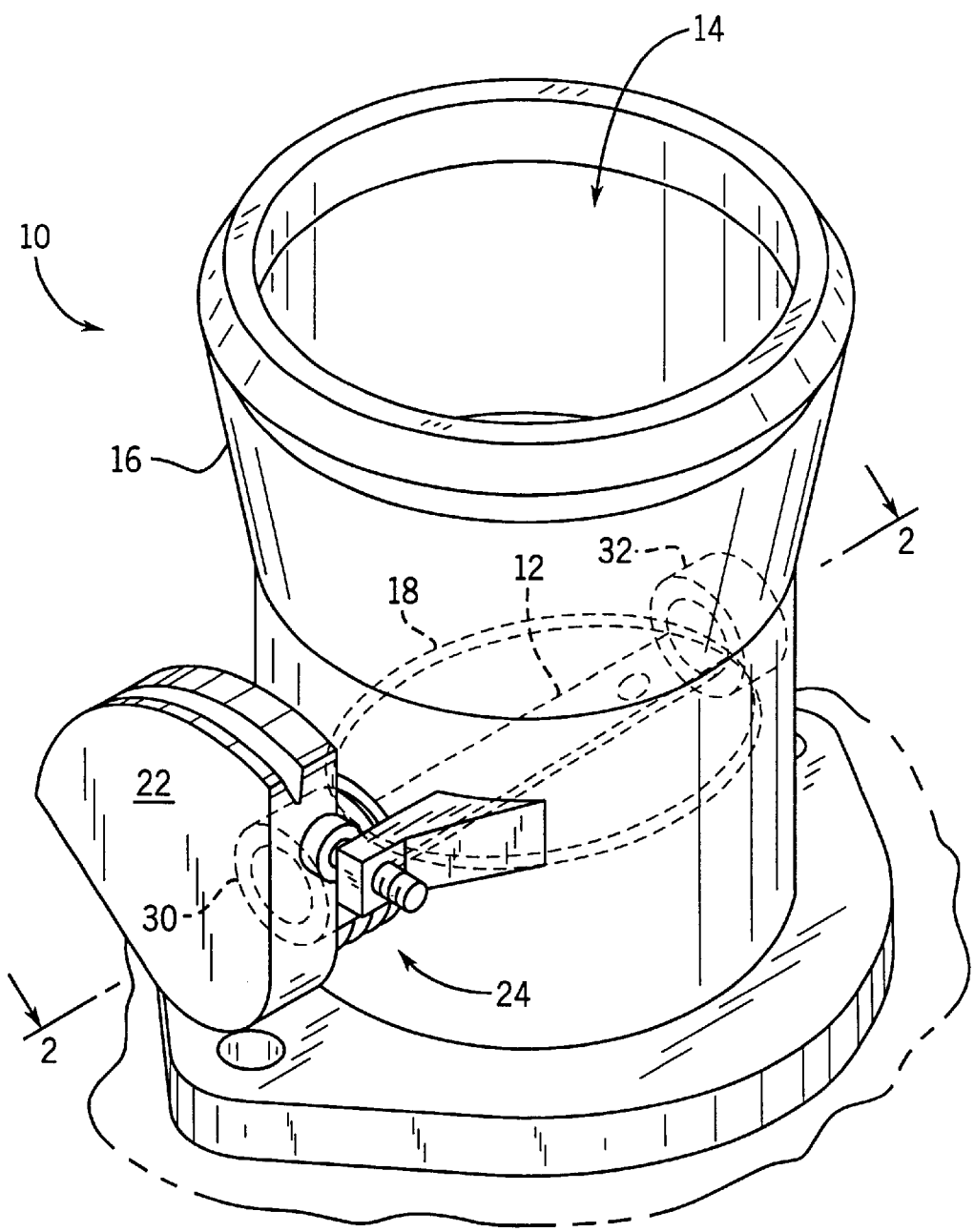
FIG. 1 is a perspective view of a throttle valve in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
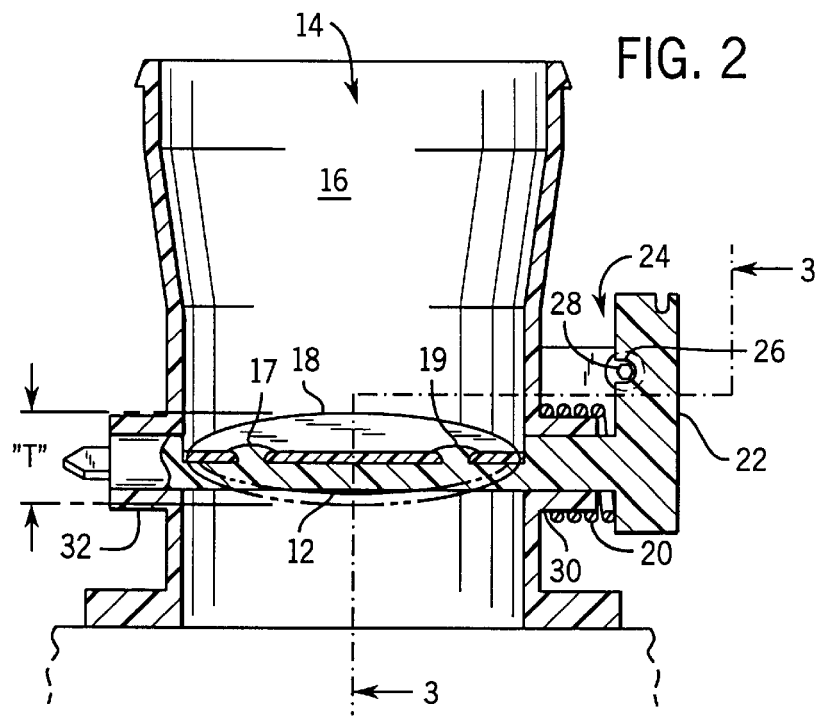
FIG. 2 is a cross-sectional view of the throttle valve of FIG. 1 taken at Section 2—2 in FIG. 1 and through the length of the throttle shaft showing the fitment of the throttle shaft and its butterfly in the throat of the throttle body.
Figure 3:
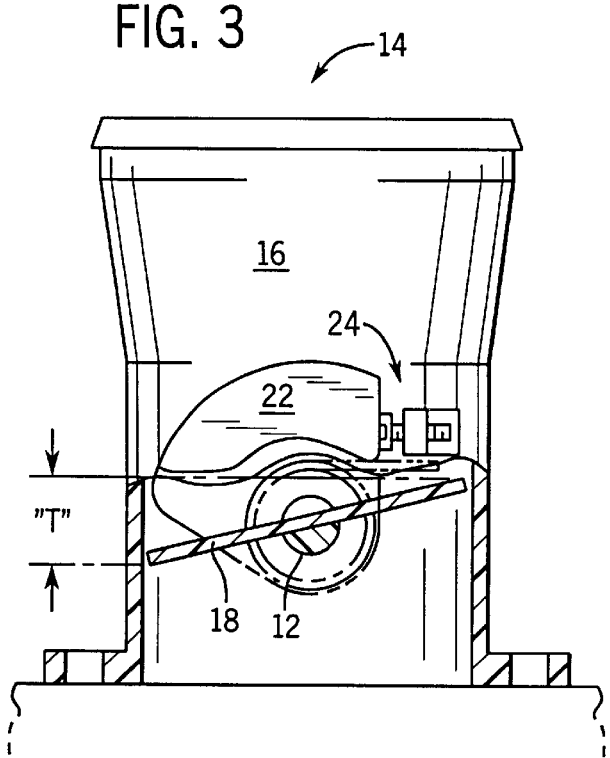
FIG. 3 is a partial cross-sectional view of the throttle valve of FIG. 1 taken at Section 3—3 in FIG. 1 perpendicular to the length of the throttle shaft.

Referring to FIGS. 1–3, a throttle valve 10 is shown having a throttle shaft 12 extending across combustion air passageway (or throat) 14 of throttle body 16. A butterfly 18 is fixedly mounted to throttle shaft 12 and is located in combustion air passageway 14. Throttle lever 22 is fixed to the throttle shaft, and a cable (not shown) extends from the throttle lever. In operation, throttle lever 22 is pulled by the cable causing the throttle shaft to rotate and the butterfly to open.

A throttle valve return spring 20 is disposed about the periphery of throttle shaft 12 having one end engaged with the throttle shaft and another engaged with the throttle body. Return spring 20, which is coiled around the throttle shaft, rotates the throttle shaft to a substantially closed position when the cable is released. In the substantially closed position throttle lever 22 abuts throttle stop 24 that is screwed into throttle body 16. In this manner, return spring 20 pulls throttle lever 22 against throttle stop 24 when the cable is released. Throttle lever 22 is preferably integrally molded with shaft 12.

An aperture 26 is provided in lever 22 where the lever abuts throttle stop 24. This aperture permits throttle stop 24 to be adjusted when the throttle valve is closed. Throttle stop 24 has a recess 28 that is engaged by a screwdriver, a hex wrench, a Torx driver or similar rotating tool for screwing the throttle stop into or out of throttle body 16.

To adjust the throttle stop (which typically regulates minimum engine airflow) the tool is inserted through aperture 26 and into recess 28 that it engages to transmit rotational forces. As throttle stop 24 is rotated, it advances into or out of throttle body 16. Since throttle lever 22 is held against throttle stop 24 by return spring 20, the adjustment of throttle stop 24 also adjusts the rotational position of throttle lever 22, throttle shaft 12, and butterfly 18.

Throttle shaft 12 extends across combustion air passageway 14 and is supported for rotation at either end by bosses 30 and 32. These bosses are sized to permit throttle shaft 12 to rotate with respect to throttle body 16 but to limit the leakage of air into or out of passageway 14 between throttle shaft 12 and bosses 30, 32. The bosses are located on opposing sides of throttle body 16 and are disposed to locate throttle shaft 12 substantially in the middle of throttle body 16 and substantially perpendicular to the longitudinal axis of passageway 14 (i.e. the direction of air flow). Shaft 12, in the region where it is supported for rotation by throttle body 16, has a diameter of 9–13 mm, and preferably between 10 and 12 mm.

Two bosses, throttle shaft 17, 19 extend from throttle shaft and through corresponding holes in butterfly 18. These are mushroomed on the ends to attach butterfly 18 to shaft 12.

As shown in FIG. 2, boss 30 supports a length of the throttle shaft between throttle lever 22 and butterfly 18. Given the preferred 2 to 4 millimeter average wall thickness of the combustion air passageway 14, this additional support provides an extended bearing surface for throttle shaft 12. Boss 30 preferably has a wall thickness of between 2 and 4 mm.

In prior art separately assemblable throttle valves, the bore diameter of a first boss (item 30' in FIG. 4B) is substantially greater due to the need to insert plastic or metal bushings or bearings into the first boss to surround and support the subsequently inserted throttle shafts. As a result, for a boss with a typical wall thickness of 2–6 millimeters, the ratio of boss wall thickness to overall boss diameter is preferably between 1:4 and 1:8, or more preferably between 1:5 and 1:7, and the ratio of boss wall thickness to combustion air passageway wall thickness is preferably between 1:1 and 1:2. The inside diameter of boss 30 is between 9 and 13 mm, and preferably between 10 and 12 mm.

The practical effect of eliminating the bearing or bushing is to reduce the volume of plastic required to form the boss since the inside diameter of the boss is reduced. By reducing the volume of plastic required to form the first boss, there is a subsequent reduction or elimination of sinks and voids in the combustion air passageway wall where that wall adjoins the first boss 30.

As best seen in FIGS. 2 and 3, a portion. T of the passageway wall surrounds butterfly 18 when butterfly 18 is in a substantially closed position. When butterfly 18 is in this substantially closed position, a small gap between the edge of the butterfly 18 and the passageway wall is provided to permit the flow of a very small quantity of air. This gap is carefully controlled by adjusting throttle stop 24.

Quite small adjustments of throttle stop 24 that cause very small movements of butterfly 18 toward or away from its substantially closed position can cause dramatic changes in the performance of an internal combustion engine to which throttle valve 10 is attached. Sinks, voids and distortion in the inner passageway wall in region T similarly cause dramatic changes in the performance of the engine even though they are quite small. This is particularly true for throttle bodies in which butterfly 18 is formed in separate process and subsequently attached to throttle shaft 12. In a worst case scenario, it may be impossible to close butterfly 18 sufficient to permit the engine to operate at an idle. Eliminating the use of a bearing, bushing or insert to support throttle shaft 12 permits the inside diameter of boss 30 to be reduced. This permits the outside diameter of boss 30 to be reduced, which thereby reduces the volume of plastic that is diverted into the mold cavity that forms boss 30.

The degree to which the boss volume is reduced can be expressed as a volumetric ratio: the ratio of the volume of plastic in bosses 30 and 32 (to be discussed below) to the volume of plastic forming the throat of the throttle body in region T. Region T is defined as that portion of the throttle body passageway extending between the upper edge of butterfly 18 and the lower edge of butterfly 18 when the butterfly is closed. In the embodiment of FIGS. 1–3, boss volume to throat volume ratios of 0.5 or less can be achieved. With careful design, boss to throat volume ratios of 0.3 or less can be provided.

Second boss 32 is provided on the diametrically opposite wall of the throttle body to receive and support the free end of the throttle shaft. The second boss has the same ratios of thickness and diameter as described above regarding the first boss. As shown in FIG. 4A, prior art bosses 32' that support the free end of the throttle shaft also had larger inner and outer diameters due to the need to provide a bearing (as shown), bushing or insert to support the free end of the throttle shaft.

Throttle body 16 is preferably comprised of plastics such as polyamide (PA), polybutylene terepthalate (PBT), high temperature nylon (HTN), syndiotactic polystyrene (SPS), polyphenylene sulphide (PPS), polyetherimide (PEI), polyethersulphone (PES), polyamide-imide (PAI), polypthalamide (PPA), polypropylene (PP) or polyethylene terepthalate (PET). Of these, PA, PBT, HTN, SPS, PPS and PEI are preferred. Of these, PA, PBT, HTN and SPS are particularly preferred. If the throttle body is molded integral with an intake manifold, the preferred materials for forming this integrated unit would be PA, PBT, PET, SPS and PP.

Throttle shaft 12 is comprised of a resin/solid lubricant blend where the resin is preferably a high temperature nylon (HTN), polyetherimide (PEI), polyamide (PA), polypthalarnide (PPA), polyphenylene sulphide (PPS), polyethersulphone (PES), liquid crystal polymer (LCP, "Zenite" by DuPont), polyetherketone (PEK) and polyamide-imide (PAI). The solid lubricant is preferably a fluorinated hydrocarbon, graphite or molybdenum disulphide. The preferred fluorinated hydrocarbon is a fluoroethylene polymer, most preferably polytetrafluoroethylene (PTFE). The mass percentage of solid lubricant in the resin/solid lubricant blend is preferably between 8% and 20%. More preferably it is between 12% and 18%. The addition of a solid lubricant to the traditional throttle shaft resins is disadvantageous since it significantly reduces the strength and the elastic modulus of throttle shaft 12. As an example, a 100% polyamide plastic has been identified as having a tensile strength of 12,000 psi whereas the same material with 20% by weight of PTFE has a strength of 9,000 psi. In addition, the flex modulus of 100% polyamide is 410 ksi, whereas the 80/20 polyamide blend is only 350 ksi. Thus, providing a PTFE blended throttle shaft would appear to substantially reduce its strength and toughness.

In practice throttle shafts with added solid lubricants, such as PTFE, do not fail as often as the statistics would suggest. Indeed, tests simulating the particular environment suggest that, contrary to expectations, throttle shafts filled with solid lubricants such as PTFE get tougher with abuse.

During typical testing, throttle body 16 is cycled between −40 C. and +140 C. as testing is performed. The testing includes snap testing in which the throttle lever 22 is pulled away from throttle stop 24 until the valve is entirely open, and then the lever is released, at which point return spring 20 causes throttle shaft 12 and butterfly 18 to accelerate toward the closed position. When throttle lever 22 suddenly abuts throttle stop 24, the lever/shaft/butterfly subassembly is subject to a severe deceleration. As a result, a severe oscillating torsional load is applied to shaft 12 as butterfly 18 oscillates back and forth. This test is typically performed for a thousand cycles. The testing also includes cyclical testing, in which the valve is rapidly opened and closed for two million cycles. In both of these tests, a vacuum is applied to the outlet side of the butterfly to simulate engine vacuum and hence the bending and shear forces applied to the throttle shaft by that vacuum.

This testing process has been designed to reflect the type of loads that are placed on the throttle shaft during a lifetime of operation. These oscillating torsional loads and bending moments have the additional effect of strengthening a PTFE-filled throttle shaft in a manner not suggested by published strength and elongation figures.

The oscillating torsional loads cause the shaft to elastically deflect in torsion and subsequently relax to an unstressed state. This torsional deflection and relaxation causes the PTFE to migrate from the stressed fibers to the surface of the shaft, increasing the strength of the shaft in the stressed layers (the outer circumferential layers) and depositing a layer of PTFE on the surface of the shaft. The more the shaft is cycled, the more PTFE migrates to the surface, the higher the shaft strength becomes and the better the lubrication. This strengthening is different from work hardening, since work hardening would require plastic deformation of the shaft—a condition that should be avoided. Plastic deformation of the shaft and butterfly may cause misalignment and accelerated wear.

By employing a solid lubricant, the contamination of motors and resistors coupled to the shaft is also reduced, since the PTFE will not migrate along the shaft surface as oil does and contaminate a resistor or motor attached to the shaft.

FIG. 5 shows an alternative embodiment of throttle shaft 12 in which a plurality of outwardly extending circular ribs or ridges 50 are disposed along its length to seal against the inner surface of the first and second bosses. These ridges preferably have a height of 0.1 to 2.0 millimeters, but are shown here out of proportion to their actual size for clarity. The PTFE migration is significant enough in the throttle shaft that these ridges center the shaft in the bore of the bosses.

To make and assemble the valve, throttle body 16 (including bosses 30, 32) are preferably molded of plastic. Throttle shaft 12 and butterfly 18 are preferably molded of plastic. Shaft 12, once formed, is inserted into the passageway defined by bosses throttle shaft 30, 32. Butterfly 18 is then inserted into throat 14 and located on bosses throttle shaft 17, 19. These bosses, throttle shaft are mushroomed to secure butterfly 18 on shaft 12. Alternatively, butterfly 18 may be secured to shaft 12 by threaded fasteners or rivets.

Thus, it should be apparent that there has been provided in accordance with the present invention a plastic throttle body that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A throttle valve for throttling the flow of combustion air to an internal combustion engine, comprising:
   a throttle body made of a first plastic and defining a throat for passing combustion air and an intersecting passageway having a boss to rotatably support a throttle shaftah throttle shaft made of a second plastic embedded with a solid lubricant, the throttle shaft, the extending through the intersecting passageway and being in direct rotational contact with the boss; and
   a butterfly fixedly mounted to the throttle shaft for rotation in the throat to throttle the flow of combustion air.

2. The throttle valve of claim 1, wherein the passageway is substantially perpendicular to the throat and is defined by first and second bosses molded integral with the throttle body and having an inner molded surface disposed to contact and support the throttle shaft.

3. The throttle valve of claim 2 wherein the throttle shaft is integrally molded with a throttle arm configured for engagement with a throttle shaft rotating means.

4. The throttle valve of claim 3, wherein the throttle shaft includes at least one throttle shaft boss and the butterfly is fixedly mounted to the at least one throttle shaft boss.

5. The throttle valve of claim 1, wherein the solid lubricant includes PTFE.

6. The throttle valve of claim 5, wherein the mass percentage of solid lubricant is between 8% and 20%.

7. The throttle valve of claim 6, wherein the mass percentage of solid lubricant is between 12% and 18%.

8. The throttle valve of claim 1, wherein the second plastic is selected from the group consisting of HTN, PEI, PA, PPA, PPS, PES, LCP, PEK and PAI.

9. The throttle valve of claim 8, wherein both the first and second plastics comprise polyamide.

10. The throttle valve of claim 1, wherein the solid lubricant is selected from the group consisting of PTFE, graphite and molybdenum disulphide.

11. A throttle valve for throttling the flow of combustion air to an internal combustion engine, comprising:
    a throttle body made of a first plastic and defining a conduit for passing combustion air and a boss defining an intersecting passageway to rotatably support a throttle shaft, the throttle shaft made of second plastic embedded with PTFE, the throttle shaft extending through the intersecting passageway and being in direct rotational contact with the boss; and
    a butterfly fixedly mounted to the shaft for rotation in the conduit to throttle the flow of combustion air.

12. The throttle valve of claim 11, wherein the butterfly is formed of plastic and is separately attached to the throttle shaft after it is inserted in the throttle body.

13. The throttle valve of claim 11, wherein the boss defines a boss volume and the throttle body includes a throat defining a throat volume, the throat at least partially surrounding the conduit, the boss volume to throat volume defining a ratio of 0.5 or less.

14. The throttle valve of claim 11, wherein the boss defines a boss volume and the throttle body includes a throat defining a throat volume, the throat at least partially surrounding the conduit the boss volume to throat volume defining a ratio of 0.3 or less.

* * * * *